US012585412B2

(12) United States Patent
Kai

(10) Patent No.: US 12,585,412 B2
(45) Date of Patent: Mar. 24, 2026

(54) INFORMATION PROCESSING APPARATUS, AND NON-TRANSITORY COMPUTER-READABLE RECORDING MEDIUM THEREFOR TO BE COMPLIANT TO A PARTICULAR PROGRAM

(71) Applicant: BROTHER KOGYO KABUSHIKI KAISHA, Nagoya (JP)

(72) Inventor: Takafumi Kai, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/159,556

(22) Filed: Jan. 27, 2021

(65) Prior Publication Data

US 2021/0149608 A1 May 20, 2021

Related U.S. Application Data

(63) Continuation of application No. 16/822,793, filed on Mar. 18, 2020, now Pat. No. 10,908,850.

(30) Foreign Application Priority Data

Mar. 22, 2019 (JP) ................................. 2019-054377

(51) Int. Cl.
*G06F 3/12* (2006.01)
*H04L 69/18* (2022.01)

(52) U.S. Cl.
CPC .......... *G06F 3/1209* (2013.01); *G06F 3/1231* (2013.01); *G06F 3/1261* (2013.01); *G06F 3/1297* (2013.01); *H04L 69/18* (2013.01)

(58) Field of Classification Search
CPC .... G06F 3/1209; G06F 3/1297; G06F 3/1231; G06F 3/1261; G06F 3/1226; G06F 3/1247; G06F 3/1285; H04L 69/18
See application file for complete search history.

(56) References Cited

U.S. PATENT DOCUMENTS

2007/0086052 A1* 4/2007 Furuya ................. G06F 3/1261
358/1.15
2007/0273919 A1 11/2007 Oomura
(Continued)

FOREIGN PATENT DOCUMENTS

JP 2005-309617 A 11/2005
JP 2015-185047 A 10/2015
(Continued)

OTHER PUBLICATIONS

Notice of Allowance dated Oct. 1, 2020 from parent U.S. Appl. No. 16/822,793.
(Continued)

*Primary Examiner* — Juan M Guillermety
(74) *Attorney, Agent, or Firm* — Scully, Scott, Murphy & Presser, P.C.

(57) ABSTRACT

A non-transitory computer-readable recording medium stores instructions realizing a program set including first and second programs. The second program causes, when executed, an information processing apparatus to obtain identifying information regarding an image processing device and store device information containing the identifying information in a memory in association with program information regarding the second program. The first program causes, when executed, the information processing apparatus to transmit device information to the operating system and retrieve, from the memory, the program information associated with the device information designated as a transmission destination by a first execution instruction staring the second program based the program information, the first execution instruction being output by the operating system using a first protocol. The second program further causes the information processing apparatus to transmit a second execution instruction corresponding to the first (Continued)

execution instruction to the image processing device using a second protocol.

8 Claims, 5 Drawing Sheets

(56) References Cited

U.S. PATENT DOCUMENTS

| | | | | |
|---|---|---|---|---|
| 2010/0277761 | A1* | 11/2010 | Sakura | G06F 3/1225 |
| | | | | 358/1.15 |
| 2012/0229846 | A1* | 9/2012 | Hadano | G06F 3/1226 |
| | | | | 358/1.15 |
| 2013/0135668 | A1* | 5/2013 | Minagawa | G06F 3/1204 |
| | | | | 358/1.15 |
| 2015/0261482 | A1* | 9/2015 | Takano | G06F 3/1285 |
| | | | | 358/1.15 |
| 2016/0080585 | A1* | 3/2016 | Kobayashi | G06F 3/126 |
| | | | | 358/1.15 |
| 2016/0205276 | A1 | 7/2016 | Nishida | |

| | | | | |
|---|---|---|---|---|
| 2016/0274835 | A1* | 9/2016 | Mihira | G06F 3/1204 |
| 2018/0011667 | A1* | 1/2018 | Chang | G06F 3/1285 |
| 2018/0210684 | A1* | 7/2018 | Kato | G06F 3/1204 |
| 2019/0056894 | A1* | 2/2019 | Hasegawa | G06F 3/1231 |
| 2019/0303068 | A1* | 10/2019 | Yamada | G06F 3/1247 |
| 2020/0301625 | A1* | 9/2020 | Kai | G06F 3/1209 |
| 2020/0301626 | A1* | 9/2020 | Kai | G06F 3/1231 |

FOREIGN PATENT DOCUMENTS

| | | |
|---|---|---|
| JP | 2015-185048 A | 10/2015 |
| JP | 2015-186228 A | 10/2015 |
| JP | 2015-187791 A | 10/2015 |
| JP | 2016-130970 A | 7/2016 |
| JP | 2018-181108 A | 11/2018 |

OTHER PUBLICATIONS

Notice of Reasons for Refusal dated Dec. 20, 2022 received from the Japanese Patent Office in related JP 2019-054377 together with English language translation.

* cited by examiner

| PRINTER NAME | MODEL NAME | CAPABILITY | ICON | APP NAME | ADDRESS NAME |
| --- | --- | --- | --- | --- | --- |
| 441 | 442 | 443 | 444 | 445 | 446 |
| PRINTER A | MODEL A | CAPABILITY A | ICON A | APP A | ADDRESS A |
| PRINTER B | MODEL B | CAPABILITY B | ICON B | APP B | ADDRESS B |

44

45

INFORMATION PROCESSING APPARATUS, AND NON-TRANSITORY COMPUTER-READABLE RECORDING MEDIUM THEREFOR TO BE COMPLIANT TO A PARTICULAR PROGRAM

CROSS-REFERENCE TO RELATED APPLICATIONS

This application is a continuation application of U.S. Ser. No. 16/822,793 filed on Mar. 18, 2020 and claims priority under 35 U.S.C. § 119 from Japanese Patent Application No. 2019-054377 filed on Mar. 22, 2019. The entire subject matter of the applications is incorporated herein by reference.

BACKGROUND

Technical Field

The present disclosures relate to a non-transitory computer-readable recording medium storing instructions which realize a program set to be implemented in an information processing apparatus configured to control an image processing device.

Related Art

Conventionally, there has been known a technique of instructing a device, which is not compliant to a particular protocol, using the particular protocol. For example, there is a system including a compliant device which is compliant to the particular protocol and a non-compliant device which is not compliant to the particular protocol. According to the conventional system, the compliant device receives an instruction directed to the non-compliant device and output by a terminal device. Then, the compliant device transfers the received instruction to the non-compliant device.

SUMMARY

In recent years, in a system having an information processing apparatus (e.g., a PC) and an image processing device (e.g., a printer), a technique of causing the image processing device to perform printing without installing, in the information processing apparatus, a device driver for the image processing device has been known. An example of such a technique is known as a driverless printing technique according to which printing is performed with use of a printing function implemented in an operating system.

However, printers (e.g., low end printers) which are not compliant to the driverless printing technique (hereinafter, referred to as non-compliant printers) are widely used. According to the above-described conventional technique, an instruction (e.g., one according to the driverless printing technique) is firstly transmitted to the compliant device, and then, it is transferred from the compliant device to the non-compliant device. However, a new technique enabling the non-compliant devices to perform image processing has been desired.

According to aspects of the present disclosures, there is provided a non-transitory computer-readable recording medium for an information processing apparatus, the recording medium storing computer-executable instructions executable by a controller of the information processing apparatus, the instructions realizing a program set including a first program and a second program, the first program being compliant to a first protocol, the second program being compliant to a second protocol. The second program causes, when executed by the controller, the information processing apparatus to perform an obtaining process of obtaining identifying information regarding an image processing device, and a storing process of storing device information containing the identifying information obtained in the obtaining process in a memory of the information processing apparatus such that the device information is associated with program information regarding the second program. The first program causes, when executed by the controller, the information processing apparatus to perform a search request responding process of responding to a search request of an operating system of the information processing apparatus by retrieving the device information from the memory and transmitting the retrieved device information to the operating system, and an execution instruction conforming process of retrieving, from the memory, the program information associated with the device information corresponding to the image processing device designated as a transmission destination by a first execution instruction staring the second program based the program information, the first execution instruction being output by the operating system using the first protocol. The second program further causes the information processing apparatus to perform a transmitting process of transmitting a second execution instruction corresponding to the first execution instruction to the image processing device using the second protocol.

According to aspects of the present disclosures, a non-transitory computer-readable recording medium for an information processing apparatus, the recording medium storing computer-executable instructions realizing a first program which is implementable in an operating system of the information processing apparatus, the first program corresponding to a first protocol, the information processing apparatus having a memory storing device information containing identifying information regarding an image processing device in a manner associated with program information regarding a second program, the second program corresponding to a second protocol. The instructions cause, when executed by a controller of the information processing apparatus, the information processing apparatus to perform a response request responding process of retrieving, from the memory, the device information in response to the search request output by the operating system, and an execution instruction conforming process of retrieving, based on a first execution instruction received from the operating system using the first protocol, the program information associated with the device information corresponding to the image processing device designated, by the first execution instruction, as a transmission destination from the memory and starting the second program based on the retrieved program information, the second program causing, when started, the information processing apparatus to transmit a second execution instruction corresponding to the first execution instruction to the image processing device using the second protocol.

According to aspects of the present disclosures, there is provided in information processing apparatus which is provided with a memory, a controller and a non-transitory program storage storing computer-executable instructions realizing a program set including a first program corresponding to a first protocol and a second program corresponding to a second protocol. The second program causes, when executed by the controller, the information processing apparatus to perform an obtaining process of obtaining identifying information regarding an image processing device, and a storing process of storing device information containing the identifying information obtained in the obtaining process in a memory of the information processing apparatus such that the device information is associated with program information regarding the second program. The first program causes, when executed by the controller, the information processing apparatus to perform a search request responding process of responding to a search request of an operating system of the information processing apparatus by retrieving the device information from the memory and transmitting the retrieved device information to the operating system, and an execution instruction conforming process of retrieving, from the memory, the program information associated with the device information corresponding to the image processing device designated as a transmission destination by a first execution instruction staring the second program based the program information, the first execution instruction being output by the operating system using the first protocol. The second program further causes the information processing apparatus to perform a transmitting process of transmitting a second execution instruction corresponding to the first execution instruction to the image processing device using the second protocol.

BRIEF DESCRIPTION OF THE ACCOMPANYING DRAWINGS

Figure 4:
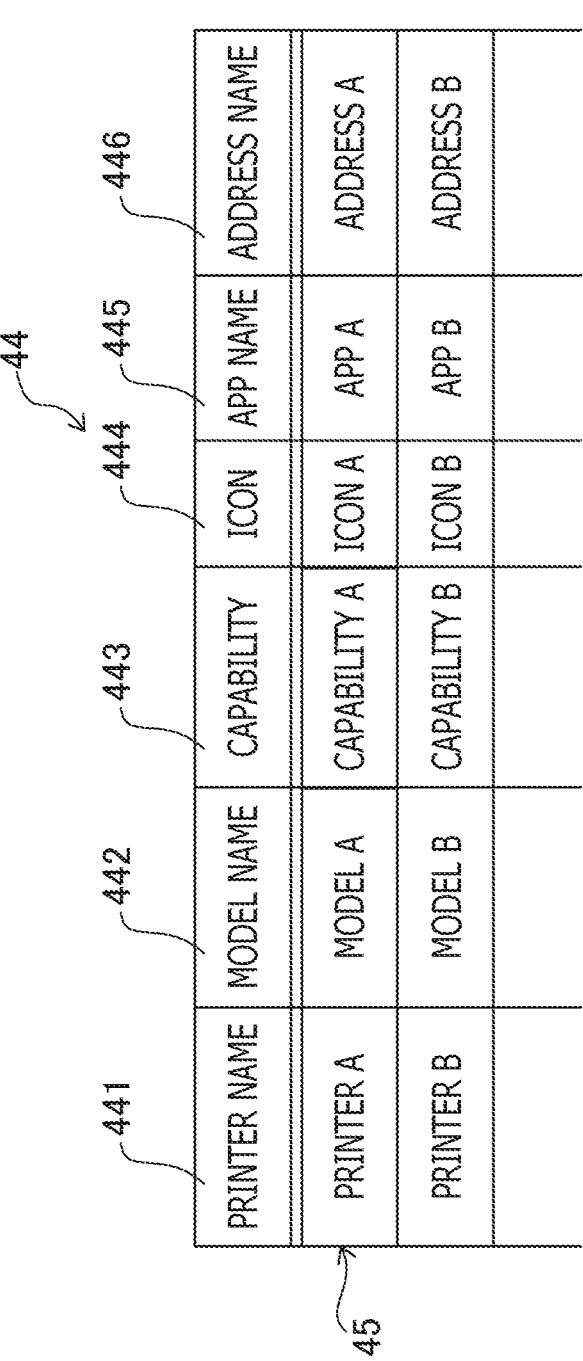

FIG. 4 schematically shows an example of printer information.

Figure 5:
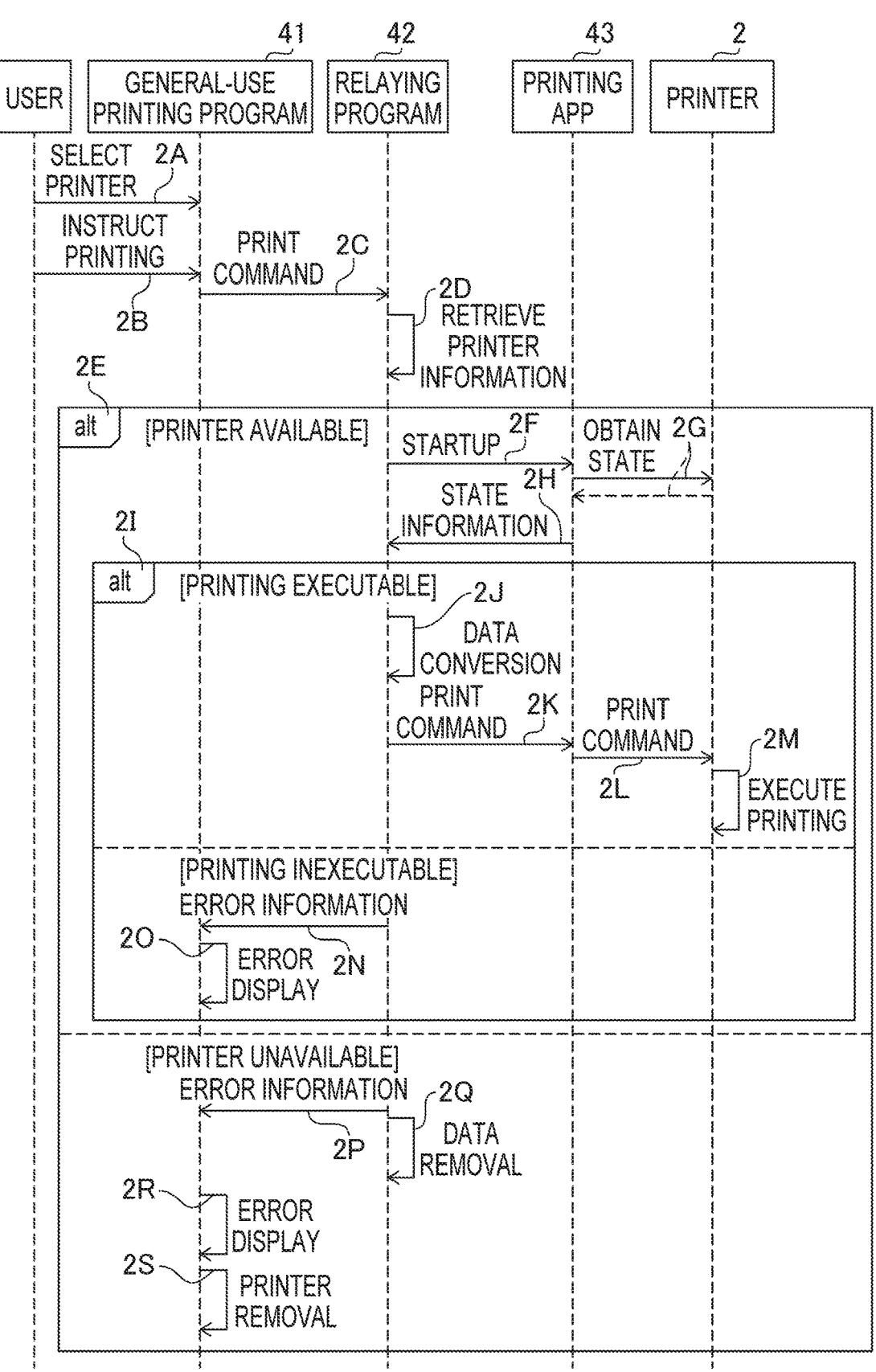

FIG. 5 is a sequence diagram illustrating a procedure of printing.

DETAILED DESCRIPTION OF THE EMBODIMENT

Hereinafter, referring to the accompanying drawings, an embodiment realizing a program set will be described in detail. In the present specification, a personal computer (hereinafter, referred to as a PC) 1 provided with the program set and configured to control an image processing device will be described.

Figure 1:
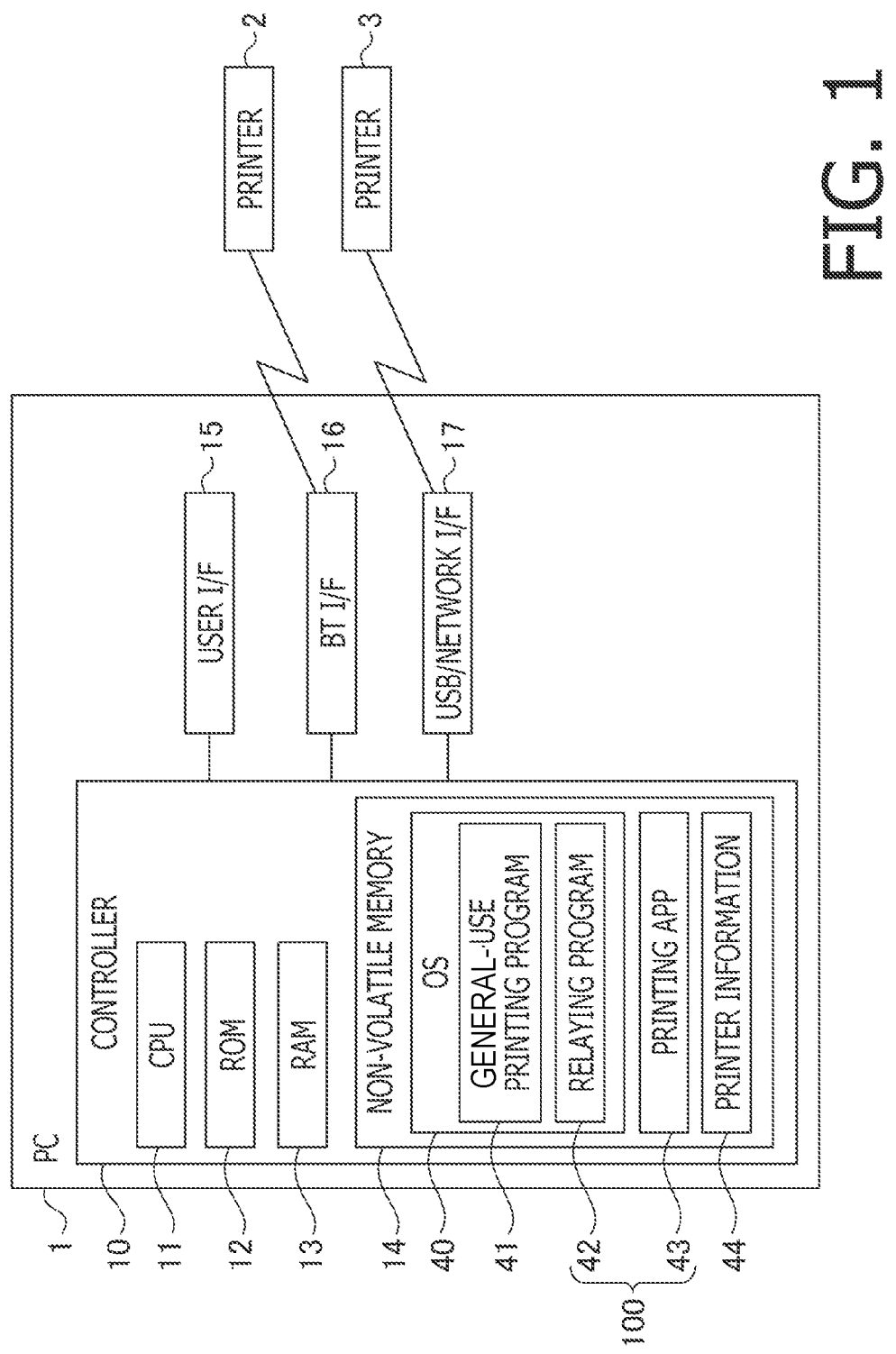
FIG. 1 is a block diagram showing an electrical configuration of a print system according to an embodiment of the present disclosures.

The PC 1 is an apparatus which is capable of executing various programs and is connected with external apparatuses, for example, a printer 2 and a printer 3 as shown in FIG. 1. It is noted that PC 1 is an example of an information processing apparatus. Each of the printer 2 and the printer 3 is an apparatus having an image processing function and an example of an image processing device. It is noted that another apparatus such as a smartphone of a tablet computer may be used instead of the PC 1. Each of the printer 2 and the printer 3 may be a single function apparatus having only a printing function, or a multiple function apparatus having multiple functions such as an MFP, a copier or a facsimile machine.

The PC 1 has, as shown in FIG. 1, a controller 10 including a CPU 11, a ROM 12, a RAM 13 and a non-volatile memory 14. The PC 1 is further provided with a user interface (hereinafter, referred to as a user I/F) 15, a Bluetooth® interface (hereinafter, referred to as a BT I/F) 16 and a USB interface or a network interface (hereinafter, referred to as a USB/network I/F) 17, which are electrically connected with the controller 10. It is noted that the name "controller" 10 in FIG. 1 is a collective name including hardware and software used to control the PC 1 and may not necessarily mean a single piece of hardware existing in the PC 1.

The CPU 11 performs various processes in accordance with programs retrieved from the ROM 12 or the non-volatile memory 14, or in accordance with user instructions. It is noted that the CPU 11 is an example of a computer. The ROM 12 stores a startup program used to start up the PC 1. The RAM 13 is used as a work area when various processes are performed, or a storage area for temporarily storing data. The non-volatile memory 14 is an SSD, an HHD or a flash memory, and is used as an area storing various programs and/or various settings. It is noted that each of the ROM 12, the RAM 13 and the non-volatile memory 14 is an example of a memory. When the CPU 11 is provided with a buffer area, the buffer area is also an example of the memory.

In the non-volatile memory 14, an operating system (hereinafter, referred to as an OS) 40, various applications (hereinafter, referred to as APP) including an application program for printing (hereinafter, referred to as a printing APP) 43, and printer information 44 are stored. The OS 40 includes a general-use printing program 41 and a relaying program 42. The OS 40 is, for example, Microsoft Windows®, MacOS®, or Linus®. Each of the general-use printing program 41 and the relaying program 42 is implemented in the OS 40 and operates as a part of the OS 40. In contrast, the printing APP 43 is not included in the OS 40. The relaying program 42 is an example of a first program, the printing APP 43 is an example of a second program, and a set 100 of the relaying program 42 and the printing program 43 is an example of a program set. Operations of respective programs will be described later.

The user I/F 15 includes hardware configured to receive user input and display information. The user I/F 15 may be, for example, a touch panel, or a combination of a keyboard and/or mouse and a display.

The BT I/F 16 includes hardware for communicating with external equipment such as the printer 2 according to Bluetooth which is one of short-range wireless communication standards. The PC 1 is configured to communicate with the printer 2 using a protocol for a printer through the BT I/F 16 (hereinafter, such a protocol using the BT I/F 16 will be referred to as a BT protocol).

The USB/network I/F 17 includes hardware for communicating with external equipment such as the printer 3 in accordance with the USB standard or one of various kinds of network standards. The PC 1 performs a communication with the printer 3 using an IPP (Internet Printing Protocol) in accordance with TCP/IP through the USB/network I/F 17. As above, the PC 1 according to the embodiment has a plurality of types of communication interfaces having different communication methods, and is configured to be compliant to the plurality of communication protocols through the plurality of interfaces, respectively. It is noted that the IPP is an example of a first protocol and the BT protocol is an example of a second protocol.

The printer 2 according to the present embodiment has a Bluetooth interface and configured to perform a communication using the BT protocol. The printer 2 according to the present embodiment is not compliant to the IPP. Therefore, when the PC 1 transmits data to the printer 2 using the IPP, the printer 2 cannot receive the data correctly. In contrast, the printer 3 according to the present embodiment has a USB interface or a network interface and is configured to perform a communication using the IPP. Accordingly, when the PC 1 transmits data to the printer 3 using the IPP, the printer 3 is capable of correctly receiving the data transmitted from the PC 1.

The general-use printing program 41 included in the OS 40 of the PC 1 according to the present embodiment is a general-use program which operates various processes regarding printing, and is a program compliant to a plurality of models of printers respectively provided by a plurality of venders. Examples of the general-use printing program 41 are AirPrint® and Mopria®. The general-use printing program 41 receives various instructions regarding printing and transmits a print command containing the print data to the designated device so that the designated device is caused to perform printing. By using the general-use printing program 41, the user can make any of various models of printer perform printing by the same procedure. It is noted that the general-use printing program 41 is configured to output the print command using the IPP. Therefore, when the general-use printing program 41 needs to transmit the print command to the printer 2 based on the received user instruction, the general-use printing program 41 outputs the print command using the IPP.

Figure 2:
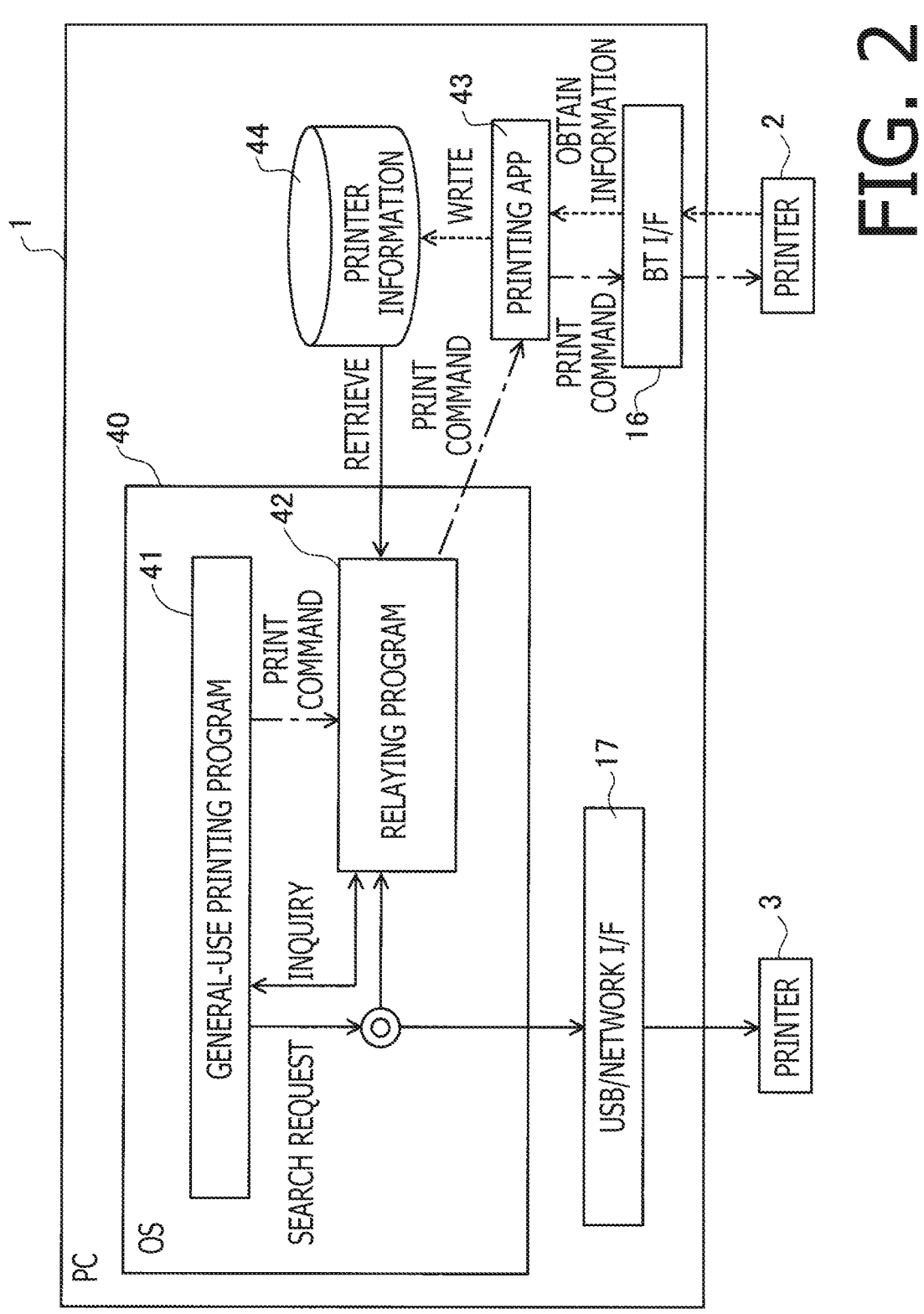
FIG. 2 illustrates data flow in a PC of the print system.

Configurations of the respective programs are shown in FIG. 2. The OS 40 includes the general-use printing program 41 and a relaying program 42. As indicated by solid lines in FIG. 2, the general-use printing program 41 causes the PC 1 to output a search request to search for a device to perform printing, and an inquiry signal, to the device which responds to the search request, a signal inquiring capability of the device. The inquiry signal is output using the IPP.

The set 100 of the relaying program 42 and the print APP 43 constitute a program which responds in place of the printer 2 when the general-use printing program 41 outputs the signal using the IPP, and transmits information based on such a signal to the printer 2 using the BT protocol. That is, the PC 1 according to the present embodiment relays a communication between the general-use printing program 41 and the printer 2 with use of the set 100 of the relaying program 42 and the printing APP 43.

In response to the inquiry signal output by the general-use printing program 41, the relaying program 42 transmits the information on the printer 2 to the general-use printing program 41 based on the information relaying program 42 has retrieved from the printer information 44. In the printer information 44, the information on the printer 2 retrieved from the printer 2 is written in advance by the printing APP 43. That is, retrieval and writing of the information indicated by broken lines in FIG. 2 have been performed before the inquiry by the general-use printing program 41.

When the general-use printing program 41 receives the response to the inquiry signal regarding the information on the printer 2 from the relaying program 42, the general-use printing program 41 recognizes that the printer 2 is a printer compliant to the IPP and outputs a print command to the relaying program 42 as indicated by one-dotted lines in FIG. 2. That is, the relaying program 42 responds to the general-use printing program 41 as if the printer 2 is compliant to the IPP, and the general-use printing program 41 delivers the print command to the relaying program 42 with regarding the relaying program 42 as the printer 2 which is compliant to the IPP. The print command is transmitted from the general-use printing program 41 to the relaying program 42 using the IPP.

When the print command to cause the printer 2 to perform printing is output by the general-use printing program 41 using the IPP, the relaying program 42 receives the same and causes the PC 1 to start the printing APP 43. Further, the relaying program 42 delivers the received print command to the printing APP 43. Then, the printing APP 43 converts the transmission protocol of the print command to the BT protocol, and transmits the print command to the printer 2 through the BT I/F 16. Since the printer 2 is compliant to the BT protocol, the printer 2 correctly receives the print command transmitted from the printing APP 43 through the BT I/F 16.

It is noted that the search request output by the general-use printing program 41 is also transmitted to external equipment such as the printer 3 through the USB/Network I/F 17 as shown in FIG. 2. Since the printer 3 is compliant to the IPP, the printer 3 correctly receives and responds to the inquiry signal and the print command, which are output by the general-use printing program 41.

Figure 3:
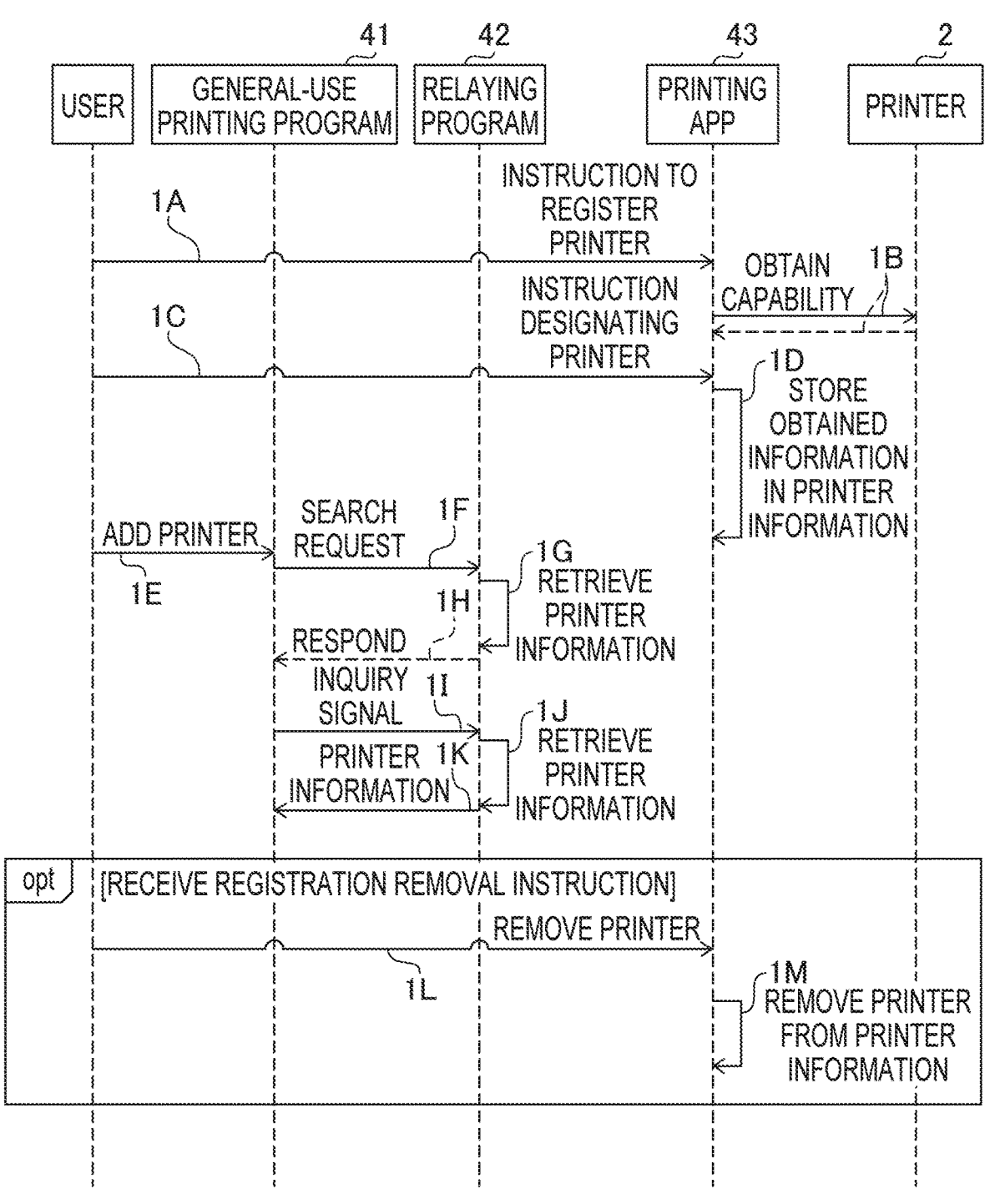
FIG. 3 is a sequence diagram illustrating a procedure to add a printer to the print system.

Next, referring to the sequence diagram shown in FIG. 3, procedures of respective programs (i.e., the general-use printing program 41, the relaying program 42 and the printing APP 43) will be described. According to the present disclosures, a procedure to cause the printer 2, which is not compliant to the IPP, to perform printing based on the print command which is output by the general-use printing program 41 using the IPP will be described. In the following description, a preparation procedure to add the printer 2 to the general-use printing program 4, and a printing procedure to transmit the print command to the added printer 2 will be described subsequently.

Firstly, referring to FIG. 3, the preparation procedure will be described. FIG. 3 shows the sequence diagram indicating the preparation procedure which is performed when an instruction to register and an instruction to add the printer 2 are received. The preparation procedure is started in response to receipt of a printer registration instruction by the user in a state where the relaying program 42 and the printing APP 43 have been installed and the printing APP 43 has been started (see procedure 1A: hereinafter, simply referred to as "proc. 1A"). It is noted that the procedure 1A is an example of a registration process.

When the printing APP 43 receives the printer registration instruction from the user (proc. 1A), the printing APP 43 obtains (i.e., requests for and receives) printer identifying information and capability information from peripheral printers (proc. 1B). It is noted that, in FIG. 3, only one printer (i.e., the printer 2) is shown for the sake of explanation. The printer identifying information includes, for example, a printer name, a model name and an address (e.g., an IP address), and is used for identifying the printer. The capability information is information regarding the printer 2, and includes information indicating the print settings which the printer 2 can receive and handle, and information indicating an optional device attached to the printer 2. The printer identifying information is an example of identifying information. Procedure 1B is an example of an obtaining process.

The user designates a printer to be registered based on the obtained information (proc. 1C). When there are multiple printers subjected to selection, the user only needs to select a printer which is not compliant to the IPP but performs printing in accordance with the print command output from the general-use printing program 41 as the printer to be registered. Since only the printer, for which the printing APP 43 receives the registration instruction, is subjected to processing by the relaying program 42, a processing load to the relaying program 42 can be reduced by registering only necessary printer in comparison with a case where all of the multiple printers are registered.

The printing APP 43 stores the identifying information and the capability information obtained in procedure 1B in the printer information 44 in the non-volatile memory 14 (proc. 1D). It is noted that procedure 1D is an example of a storing process. The printer information 44 is information which can be referred to from the printing APP 43 and from the relaying program 42. The relaying program 42 is capable of retrieve the information stored in procedure 1D from the printer information 44.

An example of the printer information 44 is shown in FIG. 4. The printer information 44 is a database including a plurality of pieces of information on each of the printers, from which the registration instructions are received, as a record 45. The printer information 44 includes, as shown in FIG. 4, a printer name 411, a model name 442, capability 443, icon 444, an APP name 445, an address name 446. The printer name 441 is identification information indicating the registered printer. The model name 442 is information regarding the model of the printer. The capability 443 is information indicating print setting which the printer can acquire. The icon 444 is information showing an image indicating the printer as an icon on a printer selecting screen. The APP name 445 is information indicating an APP to be started when the printer is selected. The address name 446 is information indicating a location of the printer. The record 45 is an example of device information. The APP name 445 is an example of program information.

When the information regarding the printer 2 is stored in procedure 1D, the printing APP 43 makes information indicating the printing APP 43 itself be included as an APP name 445. When the printing APP 43 is compliant to a plurality of models of the printers, the printing APP 43 can obtain information regarding protocols which can be used in the printers based on, for example, the model name 442 of the printer. It is noted that a plurality of printing APP's 43 may be used for respective models of the printers. For example, when a plurality of models of printers which are not compliant to the IPP are connected with the PC 1, a plurality of types of printing APP's 43 may be provided to the PC 1.

After the printing APP 43 receives the registration instruction to register the printer 2, the general-use printing program 41 receives an addition instruction to add selectable printer information (proc. 1E). When receiving the addition instruction, the general-use printing program 41 outputs a search request to search for printers which are connected with the PC 1 and compliant to the IPP (proc. 1F). The search request is performed, for example, by a multicast using Bonjour®.

In response to the general-use printing program 41 outputting the search request, the relaying program 42 retrieves the printer information 44 (proc. 1G). When the printer information 44 is stored, the relaying program 42 delivers a responding signal carrying information such as a model name to the general-use printing program 41 (proc. 1H). When the printer information on a plurality of printers is registered with the printer information 44, the relaying program 42 responds to all the registered printers by transmitting the model names and the like, respectively. Then, the general-use printing program 41 transmits an inquiry signal inquiring printer capability and the like regarding the equipment which is indicated by the responding signal to the relaying program 42 (proc.

Upon receipt of the inquiry signal output by the general-use printing program 41, the relaying program 42 retrieves the information on the printer 2 contained in the printer information 44 (proc. 1J). Then, based on the retrieved information, the relaying program 42 responds to the inquiry signal output by the general-use printing program 41 by transmitting the information regarding the printer 2 to the general-use printing program 41 using the IPP (proc. 1K). It is noted that procedure 1K is an example of a search request responding process. In the procedure 1K, the relaying program 42 delivers information containing the capability information of the printer 2, information of the relaying program 42 itself as a recipient of the print command and the information indicating that the printer 2 is compliant to the IPP to the general-use printing program 41.

Thus, the general-use printing program 41 adds, to itself, the information regarding the printer 2 received from the relaying program 42 as information of a device which can be caused to perform printing. In other words, the general-use printing program 41 memorizes information regarding a printer. Besides registration of a printer performed by the printing APP 43, the general-use printing program 41 also performs registration of a printer. An actual printer is not complaint to the IPP which is a protocol of the general-use printing program 41. However, in response to a search request by the general-use printing program 41, the relaying program 42 returns information regarding the printer. Accordingly, although the printer is not complaint to the IPP, the printer can be registered, by the general-use printing program 41, as a printer complaint to the IPP.

The information of the device added to the general-use printing program 41 is information based on the information regarding the printer 2 retrieved from the printer information 44 and the printer 2 is displayed as one of selectable items on the printer selection screen displayed by the general-use printing program 41. Accordingly, the user can select the printer 2 as a device which is caused to perform printing under the control of the general-use printing program 41.

It is noted that the printing APP 43 is capable of receiving an instruction to remove registration (hereinafter, referred to as a registration removal instruction) to remove the registered printer. When receiving the registration removal instruction to remove the registered printer (proc. 1L), the printing APP 43 removes the information regarding the printer subjected to the registration removal instruction from the printer information 44 (proc. 1M). The procedure 1L is an example of a registration removal process, and the process 1M is an example of a removing process. It is noted that, when receiving the registration removal instruction, the printing APP 43 may deliver information of the received registration removal instruction to the relaying program 42, and the relaying program 42 may remove the corresponding information from the printer information 44. By enabling the registration removal of the printer, it is possible to avoid unnecessary processes for devices which are not used any more.

Next, referring to FIG. 5, the printing procedure will be described. FIG. 5 is a sequence diagram indicating the printing procedure which is performed after the preparation procedure is completed and the print instruction by the user is received. In the printing procedure, firstly, the general-use printing program 41 receives a selection instruction indicating that the printer 2 is selected (proc. 2A), the general-use printing program 41 displays, for example, a list of printers which are candidate of a printer caused to perform printing, and receives the user selection of one of the listed printers. As mentioned above, since the information on the printer 2 has been added to the general-use printing program 41 by the relaying program 42, the user can select the printer 2 from the list of the printers as displayed.

Further, the general-use printing program 41 receives selection, by the user, of an image subjected to be printed, designation of print settings and the print instruction instructing execution of printing (proc. 2B). The general-use printing program 41 generates a print command to be transmitted to the printer 2 based on the received print instruction, and transmits the generated print command to the printer 2 using the IPP (proc. 2C). It is noted that the print command output in proc 2C is an example of a first execution instruction. The general-use printing program 41 outputs the print command to the relaying program 42 which the general-use printing program 41 recognizes as the printer 2.

The relaying program 42 retrieves the information on the printer 2, which is the selected printer, from the printer information 44 based on the print command output by the general-use printing program 41 (proc. 2D). Then, the relaying program 42 determines whether the printer information 44 contains the information regarding the printer 2 (proc. 2E). As mentioned above, when the relaying program 42 had received the instruction to remove the printer 2, the information on the printer 2 has been removed from the printer information 44.

When the relaying program 42 determines that the information regarding the printer 2 is contained in the printer information 44 (i.e., the printer 2 is available), the relaying program 42 starts the printing APP 43 based on the information on the APP name 445 which is contained, in association with the printer 2, in the printer information 44 (proc. 2F). The procedure 2F is an example of an execution instruction conforming process. The relaying program 42 delivers information indicating that the currently selected printer is the printer 2 to the printing APP 43 when the printing APP 43 is started.

The printing APP 43 receives the information on the selected printer from the relaying program 42, performs a communication with the printer 2 which is the selected printer to obtain (i.e., request for and receive) information indicating a state of the printer 2 (proc. 2G). Further, the printing APP 43 delivers state information indicating the state of the printer 2 to the relaying program 42 based on the obtained information (proc. 2H). It is noted that, instead of communicating with the printer 2 in response to startup by the relaying program 42, the printing APP 43 may deliver the state information which was obtained, in advance, from the printer 2 to the relaying program 42. Alternatively, the printing APP 43 may, for example, communicate with the printer periodically to obtain the state information.

The relaying program 42 determines whether the state of the printer 2, which state is indicated by the state information received from the printing APP 43, indicates a printing-executable state (proc. 2I). When it is determined that the printer 2 is in the printing-executable state, the relaying program 42 converts the print command output by the general-use printing program 41 to a print command having a format which can be processed by the printing APP 43 (proc. 2J). The relaying program 42 converts the print data according to the IPP to print data having PDF format data. When the print command contains print data, commands and/or parameters of which format cannot be processed by the printing APP 43, as the relaying program 42 converts the same to data of which format can be processed by the printing APP 43, a possibility that the user desired printing operations are performed is increased.

The relaying program 42 delivers information on the print command, which contains the converted print data, to the printing APP 43 (proc. 2K). It is noted that the information delivered to the printing APP 43 in procedure 2K may contain information indicating the model of the printer 2 and capability of the printer 2. It is noted that, when conversion of the print data is unnecessary, the relaying program 42 skips procedure 2J and proceeds to procedure 2K.

The printing APP 43 generates a print command suitable to the printer 2 based on the information contained in the received print command, and transmits the generated print command to the printer 2 using the BT protocol (proc. 2L). The procedure 2L is an example of a transmission process, and the print command transmitted to the printer 2 in the procedure 2L is an example of a second execution instruction. In the procedure 2L, the printing APP 43 generates a print command suitable to the printer 2 based on the identifying information and the capability information of the printer 2. The printing APP 43 rasterizes, for example, PDF data to generate rasterized data and transmits the same to the printer 2.

It is noted that conversion of the print data (proc. 2J) may be performed by the printing APP 43 instead of the relaying program 42. For example, the relaying program 42 delivers the print data received from the general-use printing program 41 to the printing APP 43 as it is (i.e., without converting the same) and the printing APP 43 may perform conversion and rasterization of the print data. Alternatively, the rasterization may be performed by the relaying program, while the relaying program 42 may directly transmits the rasterized data to the printer 2.

The printer 2 performs printing based on the print command received from the printing APP 43 (proc. 2M). Accordingly, even if the printer 2 is not compliant to the IPP, the printer 2 can perform printing in accordance with the print command which is output by the general-use printing program 41.

On the other hand, when it is determined, in the procedure 2I, that the printer 2 is not in the printing-executable state, the relaying program 42 returns error information to the general-use printing program 41 (proc. 2N) without delivering the print command to the printing APP 43. The general-use printing program 41, then, causes the user I/F 15 to notify an error (proc. 2O) based on the received error information. According to the above configuration, since the state of the printer 2, which is the destination of the print command, is checked before the print command is delivered to the printing APP 43 and the print command is delivered to the printing APP 43 on condition that the printer 2 is in a state that printing can be performed, unnecessary processes may be avoided.

When it is determined, in procedure 2E, that the information on the selected printer 2 is not contained in the printer information 44, the relaying program 42 returns error information to the general-use printing program 41 (proc. 2P). When, for example, the registration removal instruction to remove registration of the printer 2 was received, the information on the printer 2 has been removed from the printer information 44. Thus, by checking the registration state of the printer 2, unnecessary process related to the unused device can be avoided. Further, the relaying program 42 deletes the print command received in procedure 2C (proc. 2Q).

The general-use printing program 41 causes the user I/F 15 to display information indicating an error (proc. 2R) based on the received error information, and removes the information on the printer 2 (proc. 2S). Thereafter, the printer 2 will not be displayed as a candidate on the printer selection screen displayed by the general-use printing program 41. It is noted that the general-use printing program 41 may receive re-selection of a printer as a device which performs an outstanding print instruction instead of the unavailable printer 2.

As described above, the relaying program 42 according to the embodiment receives the search request from the OS 40 and responds thereto by transmitting the device information of the printer 2. Then, the relaying program 42 is identified as the printer 2 by the OS 40. Thereafter, when the relaying program 42 receives the print command from the OS 40 using the IPP, the relaying program starts up the printing APP 43, and the printing APP 43 transmits the print command to the printer 2 using the BT protocol. Thus, even if the printer 2 is not compliant to the IPP, the printer 2 can perform printing in accordance with the print command output by the OS 40 using the IPP.

It is noted that the above-described embodiment is only an example of the present disclosures and is not intended to limit the present disclosures. That is, the present disclosures may be modified and/or improved without departing from aspects of the present disclosures. For example, the execution instruction output by the OS 40 need not be limited to the print instruction. The execution instruction may be, for example, a reading instruction. In such a case, instead of the printer 2, a device having an image reading function (e.g., a scanner, an MFP, a copier, a facsimile machine or the like) may be connected with the PC 1.

In the above-described embodiment, the relaying program 42 is explained to be implemented in the OS 40. However, it is only an example and a program other than the OS 40 may be provided as a program in which the relaying program 42 may be implemented. In such a case, the relaying program 42 and the printing APP 43 may be different programs, or may be configures as a signal program.

The printer 2 may communicate with the PC 1 using any protocol other than the protocol the general-use printing program 41 uses. That is, the protocol used in a communication between the PC 1 and the printer 2 need not be limited to the BT protocol. The protocol used in the communication between the PC 1 and the printer 2 may be a USB communication using a protocol other than the IPP.

According to the above-described embodiment, when the printing APP 43 is started based on the print command, the printing APP 43 obtains the state information of the printer 2 and delivers the obtained information to the relaying program 43. Such a configuration can be modified. For example, the printing APP 43 may be configured to transmit the print command regardless of the state of the printer 2. Further, the printing APP 43 may be configured to obtain the state information immediately before transmitting the print command.

According to the embodiment, the printer 2 is configured not to respond to the search request output by the general-use program 41. However, it is modified to respond to the search request. Even if configured to respond to the search request, the printer 2 is unable to correctly respond to the signal inquiring the capability of the printer 2, the printer 2 will not be directly added to the general-use printing program 41.

It is noted that information contained in the printer information 44 need not be limited to one as illustrated in FIG. 4. For example, the icon 444 may not be contained in the printer information 44. Further, information regarding a printer node name and/or a printer connection port, usable protocol information, and the like may additionally be contained in the printer information 44.

The printing APP 43 may be configured to receive settings of print parameters intrinsic to the printer 2. Further, the printing APP 43 may be configured to receive the print settings for the printer 2 through the user I/F 15 and store the same in the non-volatile memory 14. Furthermore, the printing APP 43 may be configured to receive additional print settings or change of the print settings through the user I/F 15 when the print command is received. In such a configuration, the printing APP 43 may incorporate the received/modified settings into the print command and send the same to the printer 2.

In any of the flowcharts disclosed in the specification/drawings, multiple processes respectively performed in multiple steps can be performed in different orders as far as the change does not cause conflicts in the entire process. Further, arbitrary multiple processes respectively performed in multiple steps can be performed in a different order or in parallel as far as such a change of order does not cause conflicts in the entire process.

It is noted that each of the processes disclosed in the embodiment may be performed by a single CPU, a plurality of CPU's, hardware such as an ASIC or a combination thereof. Further, the processes disclosed in the embodiment may be realized by a non-transitory recording medium containing programs (i.e., the instructions), by methods or other means.

What is claimed is:

1. A non-transitory computer-readable recording medium for an information processing apparatus, the recording medium storing computer-executable instructions executable by a controller of the information processing apparatus, the instructions realizing a relaying program, wherein a general-use printing program, which is configured to generate print data corresponding to an image subjected to be printed, is implemented in an operating system of the information processing apparatus and operates as a part of the operating system, the relaying program transmitting and receiving data to and from the general-use printing program, wherein the relaying program causes, when executed by the controller, the information processing apparatus to:

search one or more printers to which one or more another programs are compliant, respectively, each of the one or more another programs being an application program different from the relaying program;

provide the general-use printing program with one or more pieces of identification information, the one or more pieces of identification information identifying the one or more printers which are searched and to which the one or more another programs are compliant, respectively;

receive the print data, which is generated by the general-use printing program, from the general-use printing program as a particular printer of the one or more searched printers, the relaying program being recognized as the particular printer by the general-use printing program and the relaying program receives the print data from the general-use printing program, the print data being data transmitted by the general-use printing program to be printed using the particular printer which is identified by one of the one or more pieces of identification information provided to the general-use printing program; and start a particular another program among the one or more another programs, the particular another program being compliant to the particular printer.

2. The non-transitory computer-readable recording medium according to claim 1, wherein the relaying program further causes the information processing apparatus to convert the print data received from the general-use printing program to print data having a format corresponding to the particular another program.

3. The non-transitory computer-readable recording medium according to claim 2, wherein the relaying program further causes the information processing apparatus to transmit the print data converted to the particular another program.

4. The non-transitory computer-readable recording medium according to claim 1, wherein the particular another program is a printing application used to transmit a print instruction to the particular printer.

5. The non-transitory computer-readable recording medium according to claim 1, wherein the relaying program further causes the information processing apparatus to:

provide the general-use printing program with a plurality of pieces of identification information identifying a plurality of printers, which are searched, respectively; and receive the print data to be printed using the plurality of printers.

6. The non-transitory computer-readable recording medium according to claim 1, wherein the relaying program further causes the information processing apparatus to receive the print data to be printed using one of the one or more printers.

7. The non-transitory computer-readable recording medium according to claim 1, wherein, in a first case, the relaying program further causes the information processing apparatus to convert the print data received from the general-use printing program to print data having a format corresponding to the particular another program; and wherein, in a second case, the relaying program further causes the information processing apparatus to relay the print data received from the general-use printing program to the particular another program without conversion.

8. An information processing apparatus, comprising:

a memory;

a controller; and a non-transitory program storage storing computer-executable instructions realizing a relaying program, wherein a general-use printing program, which is configured to generate print data corresponding to an image subjected to be printed, is implemented in an operating system of the information processing apparatus and operates as a part of the operating system, the relaying program transmitting and receiving data to and from the general-use printing program, wherein the relaying program causes, when executed by the controller, the information processing apparatus to:

search one or more printers to which one or more another programs are compliant, respectively, each of the one or more another programs being an application program different from the relaying program;

provide the general-use printing program with one or more pieces of identification information, the one or more pieces of identification information identifying the one or more printers which are searched and to which the one or more another programs are compliant, respectively;

receive the print data, which is generated by the general-use printing program, from the general-use printing program as a particular printer of the one or more searched printers, the relaying program being recognized as the particular printer by the general-use printing program and the relaying program receives the print data from the general-use printing program, the print data being data transmitted by the general-use printing program to be printed using the particular printer which is identified by one of the one or more pieces of identification information provided to the general-use printing program; and start a particular another program among the one or more another programs, the particular another program being compliant to the particular printer.

* * * * *